United States Patent
Frizzell

(10) Patent No.: US 11,080,578 B1
(45) Date of Patent: Aug. 3, 2021

(54) SYSTEMS AND METHODS FOR RETURNING RECOVERED PHYSICAL ITEMS

(71) Applicant: Gary Frizzell, Sedro-Woolley, WA (US)

(72) Inventor: Gary Frizzell, Sedro-Woolley, WA (US)

(\*) Notice: Subject to any disclaimer, the term of this patent is extended or adjusted under 35 U.S.C. 154(b) by 0 days.

(21) Appl. No.: 16/894,842

(22) Filed: Jun. 7, 2020

Related U.S. Application Data

(60) Provisional application No. 62/858,977, filed on Jun. 7, 2019.

(51) Int. Cl.
   *G06K 19/06* (2006.01)
   *H04W 4/35* (2018.01)

(52) U.S. Cl.
   CPC ........ *G06K 19/06028* (2013.01); *H04W 4/35* (2018.02)

(58) Field of Classification Search
   USPC .................................. 235/494, 375; 705/1.1
   See application file for complete search history.

(56) References Cited

U.S. PATENT DOCUMENTS

| | | | | |
|---|---|---|---|---|
| 9,569,950 | B1* | 2/2017 | Will | H04L 51/02 |
| 2010/0046553 | A1* | 2/2010 | Daigle | H04L 69/22 370/474 |
| 2011/0244798 | A1* | 10/2011 | Daigle | H04L 67/12 455/41.2 |
| 2013/0144634 | A1* | 6/2013 | Reynolds | G06Q 50/10 705/1.1 |
| 2015/0122883 | A1* | 5/2015 | Del Toro | G06F 1/1628 235/380 |
| 2016/0378877 | A1* | 12/2016 | Khemka | G06F 16/9554 235/375 |

\* cited by examiner

*Primary Examiner* — Allyson N Trail
(74) *Attorney, Agent, or Firm* — Newman Law, LLC

(57) ABSTRACT

A system and method for facilitating the recovery and return of lost physical items through a communication network, involving adhering a label having a unique identifier thereon to a physical item; storing a database record including the unique identifier and a user identification, the record further including the name of the owner of the physical item; recovering a lost physical item; receiving, by a client server, the unique identifier associated with the recovered lost physical item; searching, by a processing device, the database for a matching unique identifier with the unique identifier associated with the recovered lost physical item; and communicating to the user the name of the owner of the recovered lost physical item through the communication network.

4 Claims, 2 Drawing Sheets

US 11,080,578 B1

SYSTEMS AND METHODS FOR RETURNING RECOVERED PHYSICAL ITEMS

CROSS REFERENCE TO RELATED APPLICATION

The application claims priority to U.S. Provisional patent application No. 62/858,977 filed Jun. 7, 2019, the entire contents of which are incorporated herein by reference.

BACKGROUND OF THE INVENTION

Field of the Invention

The invention generally relates to systems and methods for labeling and recording personal items for the purpose of identifying the owner thereof should such personal item be lost and recovered, which is particularly well-suited, but not limited to, use in educational institutions including public school systems.

SUMMARY OF THE INVENTION

The invention is generally directed to systems and methods for facilitating the recovery and return of lost physical items.

Some embodiments of the invention are directed to a method for facilitating the recovery and return of lost physical items through a communication network, involving adhering a label having a unique identifier thereon to a physical item; storing a database record including the unique identifier and a user identification, the record further including the name of the owner of the physical item; recovering a lost physical item; receiving, by a client server, the unique identifier associated with the recovered lost physical item; searching, by a processing device, the database for a matching unique identifier with the unique identifier associated with the recovered lost physical item; and communicating to the user the name of the owner of the recovered lost physical item through the communication network.

Some embodiments of the invention are directed to a system for facilitating the recovery and return of lost physical items through a communication network, comprising one or more processors, databases and data communication devices, wherein the one or more data communication devices are configured to display a user interface on one or more display devices through the communication network and execute a program for: storing a database record including a unique identifier and a user identification, wherein the unique identifier is disposed on a physical item and the record further includes the name of the owner of a physical item; receiving a unique identifier associated with a recovered lost physical item; searching the one or more databases for a matching unique identifier with the unique identifier associated with the recovered lost physical item; and communicating to the user the name of the owner of the recovered lost physical item through the communication network.

Other embodiments, features and advantages of the invention will be readily appreciated and apparent from the following detailed description when considered in connection with the accompanying drawings.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

For illustrative purposes, the principles of the invention are described by referencing various exemplary embodiments. Although certain embodiments are specifically described herein, one of ordinary skill in the art will readily recognize that the same principles are equally applicable to, and can be employed in other systems and methods. Before explaining the disclosed embodiments of the present disclosure in detail, it is to be understood that the disclosure is not limited in its application to the details of any particular embodiment shown. Additionally, any terminology used herein is for the purpose of description and not of limitation. Furthermore, although certain methods may be described with reference to steps that are presented herein in a certain order, in many instances, these steps may be performed in any order as may be appreciated by one skilled in the art, and the novel method is therefore not limited to the particular arrangement of steps disclosed herein.

It must also be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably and the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, terms such as "mounted," "connected," "supported," "seated" and "coupled", and variations thereof, are used broadly and encompass both direct and indirect mountings, connections, supports, seating and couplings. Further, these terms are not restricted to physical or mechanical features. Unless otherwise apparent, or stated, directional references, such as "inner," "outer," "upper," "lower," "inward," "outward," and "side", and variations thereof, are intended to be relative to the parts described or orientation of a particular embodiment of the disclosure as shown in the first view of that embodiment, and are not limiting of the invention. Reference is now made to the figures wherein like parts are referred to by like numerals throughout.

Figure 1:
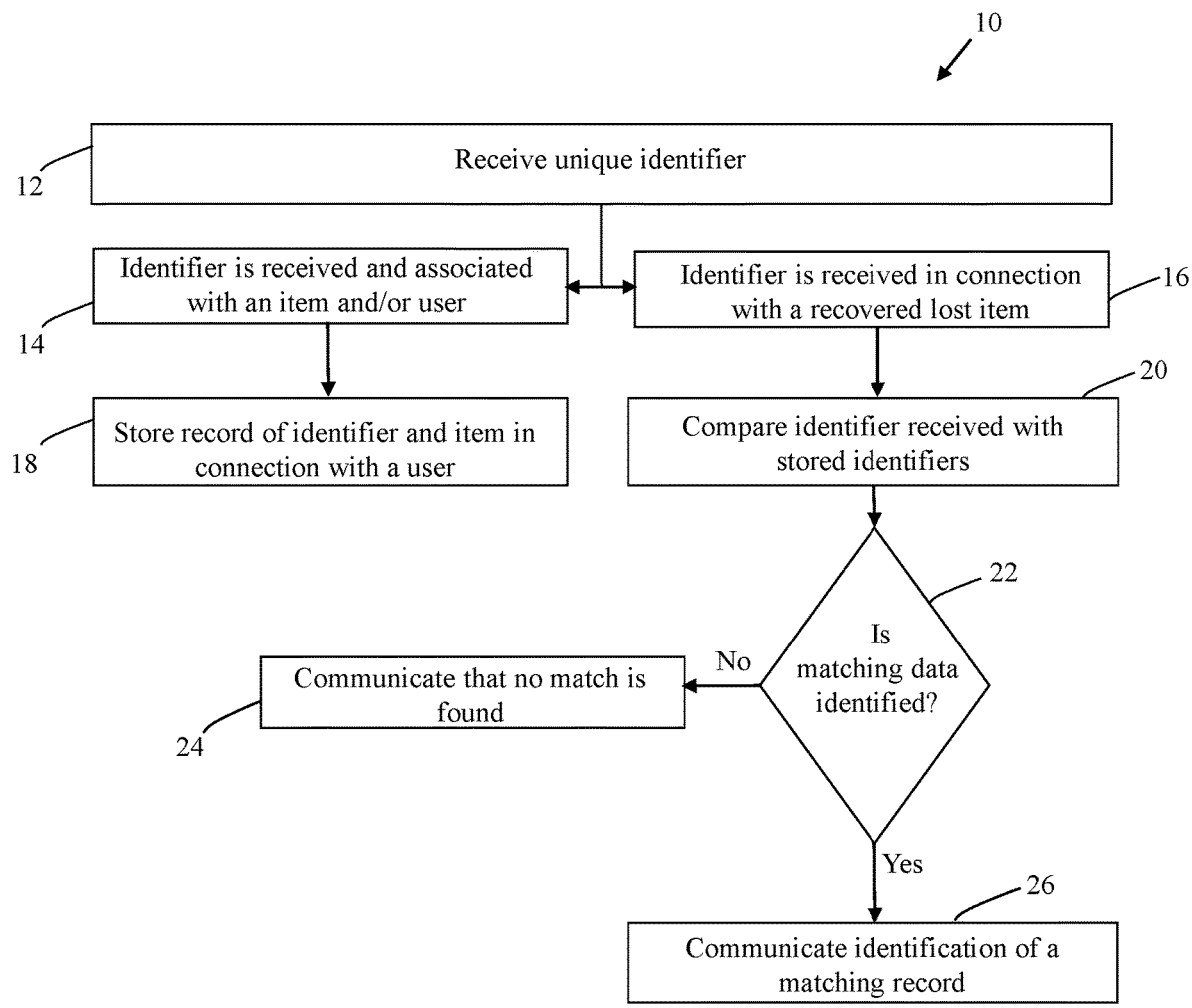
FIG. 1 is a process flow chart depicting an exemplary method configured and constructed according to some embodiments of the invention.
Figure 2:
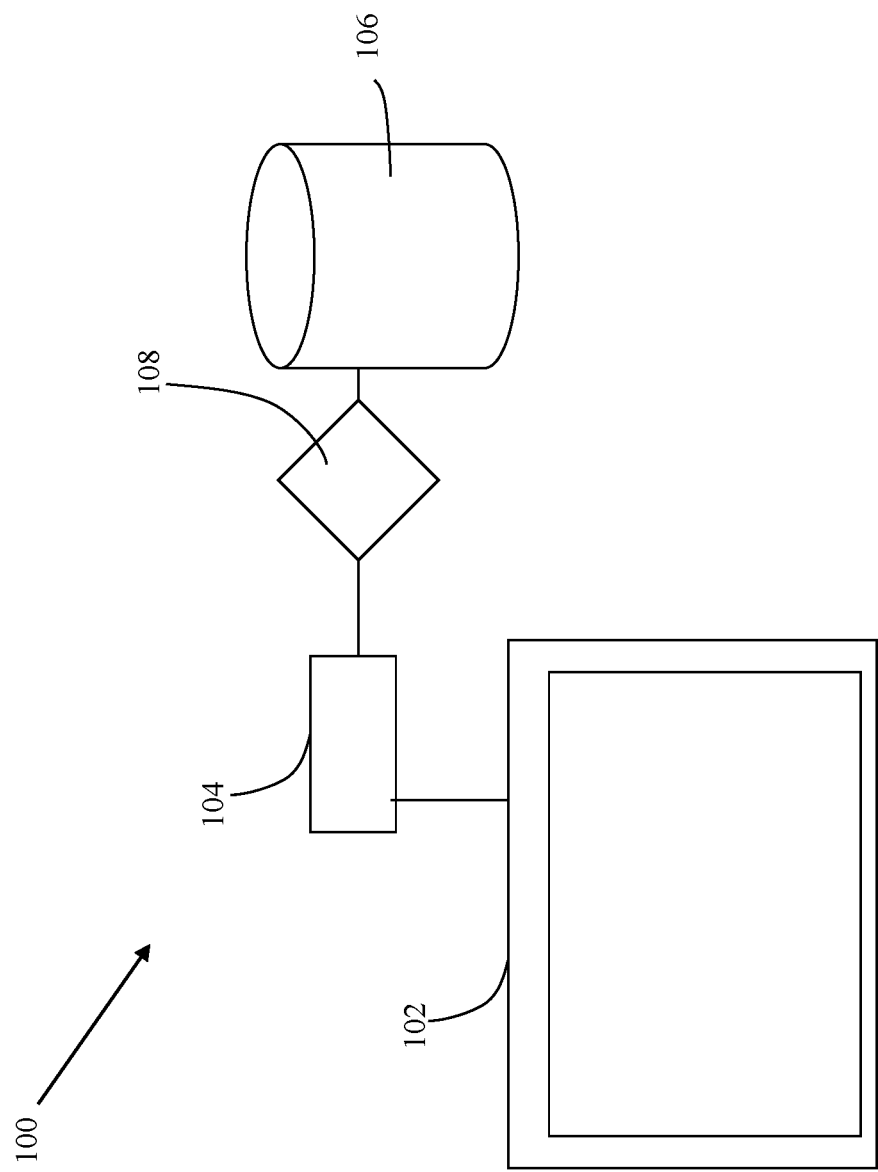
FIG. 2 is a schematic diagram depicting the components of an exemplary system configured and constructed according to some embodiments of the invention.

FIGS. 1 and 2 provides an exemplary embodiment of a method and system constructed according to the invention and generally referred to by the reference numerals 10 and 100, respectively. As shown in step 12, a unique identifier for an item is received through a remote access user interface 102 of a system 100 which may be provided via a client server 104. The user interface may consist of a data entry screen provided by a downloadable application or software, or an Internet webpage, any of which including various data fields for facilitating the entry of information.

The unique identifier received by system 10 in step 12 can be associated with an item and/or a user, such as the individual owner of the item or a company having its own unique user identifier, as shown by step 14. In some embodiments, the user establishes an account in a database 106 and the unique identifier and item are stored as a record associated with the user account in database 106.

It should be understood that the unique identifier may be any one or more characters, including numbers, letters or symbols, or combinations thereof. In some embodiments, the unique identifier is assigned to the item and may be associated with a readable code, such as a QR or a bar code. In some embodiments, the unique identifier is not visible, but rather is a signal, or a code only visible only upon certain conditions, such as writing which is revealed responsive to ultraviolet illumination.

In some embodiments, the system of the invention employs a bar code on the item, such as an item code provided by a manufacturer, distributor or seller, which is already entered into the system through a connection with the item manufacturer, distributor, or seller. In such embodiments, the item code is matched in system 10 and then associated with a user and stored in database 106.

In some embodiments, a unique identifier, such as a bar code, is applied to the item. The application may be accomplished through any conventional means, such as sticker or tag with adhesive. The unique identifier may be entered into system 10, printed on a tag and then associated with an item and/or a user. Alternatively, a tag with the unique identifier may be attached to an item and scanned into system 10 as being associated with the item and/or a user.

In some embodiments, the unique identifier is a bar code printed on a tag adhered to an item and the bar code number is then entered in system 10 through user interface 102. As described above, during the process of being entered and/or stored as a record in database 106, the unique identifier bar code is associated with a user. In some embodiments, information about the item is also stored in association with the unique identifier and user. The information about the item may include descriptive information about the item, such as the item being a leather jacket, and an electronic image of the item may be included. Other information may be stored in connection with the item, such as the name of the owner of the item, in the case of the user being a particular educational institution or the name of a contact person, such as an administrative staff member or company representative. Thus, in such embodiments, the bar code data, item information and user identification are stored as a record in a database 106.

As shown by step 16, the unique identifier may also be received through interface 102 in connection with a recovered lost item. In some embodiments, any data relating to data stored in the records in database 106 may be received, such as a unique identifier for an item or user identification. For example, a bar code reader may be used to read a bar code from a tag adhered to a recovered lost item. The data received by system 10 may also be provided through user interface 102.

As shown by step 18, if the unique identifier is received in connection with the creation of a new record, then the record is created and stored in the database associated with a user account. As shown by step 20, if the data is received in connection with a recovered lost item then it is analyzed and compared with data stored in records in database 106 with the help of a processing device 108. If no matching data is identified in the records then as shown by steps 22 and 24, system 100 will communicate that no matching record has been identified, such as through a display shown on user interface 102. The display may be facilitated by a data communication device included or in communication with system 10. As shown by steps 22 and 26, responsive to a match between the inputted data and the stored data being identified, a communication to the user is triggered. The communication may be through any means, such as text or email, according to contact information stored in the record in database 106. The communication may also include displaying information indicating a match and/or relating to the user or item through user interface 102. In some embodiments, further information may be required from a user before specific information about the match is provided. For example, system 100 may present a query to the user through user interface 102 requesting additional information such as a user login or requiring a user to correctly provide specific features or aspects about the item or user which can be matched with data previously provided in the record or user account about the item or user. Once any such requirements are met the user may be offered with the option to have the recovered item shipped, which can then prompt a payment screen for shipping and handling fees to be presented and paid by the user.

In the foregoing description, numerous specific details are set forth in order to provide a more thorough description of the invention. In particular, the foregoing detailed description provides systems, methods and apparatus generally relating to facilitating the labelling or tagging of items, the storage of item information in a user account, the matching of recovered lost items with a user, and the contacting of a user in order to reclaim the recovered lost item. It should be appreciated that the invention described could be applied to any item, such as for example, mobile devices, clothing, jewelry or watches, and other items not listed here. Thus, it will be apparent to one skilled in the art, that the invention may be practiced without at least some of the specific details provided herein. In other instances, well-known features have not been described in detail so as not to obscure the invention. It should also be understood that any method steps discussed herein, such as for example, steps involving the entering, searching, transmitting or displaying of data, may further include or involve the transmission, receipt and processing of data through conventional hardware and/or software technology to effectuate the steps as described herein.

The invention is generally directed to systems and methods for labeling items and detecting the label or a code associated therewith, such that the label or code may be uniquely correlated and therefore identify the item. For example, the labeling of an item may be through use of RFID, QR code, NFR or a weather resistant label that can be applied directly to an item, such as on the item's care tag, wherein the sticker further includes unique indicia, such as a barcode, which may be scanned and read. The tag may be read by a corresponding reader or other device for detecting RFID or NFR, or otherwise utilize another technology for detecting the label. Each unique indicia is distinguishable from all other indicia in the system and is associated with item data, wherein the item data includes one or more of the item's owner, someone or something associated with the item's owner, an individual or contact information, such as an email address or phone number. In some embodiments, the indicia and/or item data is encrypted. In some embodiments of the invention, the system of the invention is configured to process the unique indicia and then automatically contact the owner upon recognition of the item using the unique identification code.

The system of the invention may further include software or a mobile application which provides an interface for entering the unique indicia, which may be via scanning the indicia, and entering item data, which are then associated with one another and stored in a database in communication with the system. Upon an item being found or checked by the system of the invention, the unique indicia may be entered through the interface or scanned, such as by a barcode reader in the case of the unique indicia being a barcode. The system will search the database for a matching code and may then display the item information or otherwise display an indication that the code has been matched with an item. The system may then automatically contact a party as set forth by the item information to provide notification of the item being recovered.

It should be readily apparent that the systems and methods of the invention may be deployed in a wide range of applications, locations and settings, and used for diverse items, both non-living and living and perishable, such as humans, food, produce, plants and animals. Users may include government agencies, private businesses, law enforcement, military, manufacturers, retailers and other institutions. To illustrate, educational institutions may use the systems and methods of the invention for students who may place barcoded stickers on personal belongings. In this example, the barcode is associated with each student's respective teacher, and this association is maintained in the system database with no other information provided to maintain privacy. In some embodiments, a student identification number and/or room number may be included.

An application may be installed on a personal computer, mobile electronic device, smartphone or tablet which enables a camera, such as the camera on a mobile phone, to function as a barcode reader. Upon the barcode being scanned on a found item, a processor matches the scanned barcode with a teacher's contact information stored in the database. The database may be in the cloud or backed up to the cloud.

The barcode may be of any one of the several barcode formats now in being or which may be devised in the future. The number of digits represented on the barcode may vary. The barcode may be printed on a substrate, such as paper, and manually affixed by a pressure-sensitive adhesive backing on the substrate to be adhered to an item. The substrate may be any material, but is preferably resilient and flexible as well as resistant to damage from weather, such as a coated paper or plastic.

Exemplary systems constructed in accordance with embodiments of the invention may include data storage devices or databases, control programs, data processors, and communication devices for receiving and transmitting data. Those skilled in the art will readily appreciate that a system in accordance with some embodiments of the invention may include various computer and network related software and hardware, that is, programs, operating systems, memory storage devices, data input/output devices, data processors, servers with links to data communication systems, wireless or otherwise, such as the world wide web or a local or wide area network, and a plurality of data transceiving terminals capable of interfacing with the network.

Those skilled in the art will readily appreciate that a system in accordance with some embodiments of the invention may include various computer and network related software and hardware, that is, programs, operating systems, memory storage devices, data input/output devices, data processors, servers with links to data communication systems, wireless or otherwise, such as those which take the form of a local or wide area network, and a plurality of data transceiving terminals capable of interfacing with the network, such as personal computers, handheld devices, personal digital assistants (PDAs), cell phones or any other devices capable of displaying a graphical user interface. In addition, robotic systems and drones may be used to facilitate identification of items and delivery to the owner thereof.

Those skilled in the art will further appreciate that the particular types of communication network and devices, software and hardware are not vital to the full implementation of the embodiments described herein or other embodiments within the scope and spirit of the invention. Although the description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways. Furthermore, well known process steps and computer components may have not been described in detail herein in order to avoid unnecessarily obscuring the underlying concepts.

With the continuous and ongoing improvements in computer and electronic technology, many modifications may be made to the specific nature of hardware and/or software components required. Accordingly, one of skill in the art may select any hardware components that would rapidly and efficiently process the data and provide storage and communication as needed for the successful operation of some embodiments of the invention.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Additional information regarding exemplary embodiments of the invention is provided below.

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™ and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of identifier, user and item information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based.

In still further embodiments, a database is cloud computing-based. In other embodiments, a database is based on one or more local computer storage devices.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

It will be appreciated by those skilled in the art that while the disclosure of the invention has been described herein in connection with particular embodiments and examples, the invention is not necessarily so limited, and that numerous other embodiments, examples, uses, modifications and departures from the embodiments, examples and uses are intended to be encompassed by the spirit and scope of the invention described herein as would be understood to one of ordinary skill in the art.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary devices, apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A method for facilitating the recovery and return of lost physical items through a communication network, comprising the steps of:
   a) adhering a label having a unique identifier thereon to a physical item;
   b) storing a database record including the unique identifier and a user identification, the record further including the name of the owner of the physical item, one or more features of the physical item, and contact information for a user device associated with the owner;
   c) recovering a lost physical item;
   d) receiving, by a client server, the unique identifier associated with the recovered lost physical item;
   e) searching, by a processing device, the database for the database record having a matching unique identifier with the unique identifier associated with the recovered lost physical item;
   f) communicating a notification to the user device based on the contact information associated with the database record having the matching unique identifier, the notification to the user device identifying the recovered lost physical item;
   g) transmitting to the user device a query requesting at least one of one or more of the features of the physical item or the user identification stored in the record database; and
   h) responsive to receiving a response to the query matching the at least one of the one or more of the features or the user identification stored in the record database, transmitting to the user device information on shipping the recovered lost physical item.

2. A method as recited in claim 1, wherein the client server provides a user interface for receiving notification and communicating through the communication network.

3. A system for facilitating the recovery and return of lost physical items through a communication network, comprising one or more processors, databases and data communication devices, wherein the one or more data communication devices are configured to display a user interface on one or more display devices through the communication network and execute a program for:
   a) storing a database record including a unique identifier and a user identification, wherein the unique identifier is disposed on a physical item and the record includes the name of the owner of a physical item, one or more features of the physical item, and contact information for a user device associated with the owner;
   b) receiving a unique identifier associated with a recovered lost physical item;
   c) searching the one or more databases for the database record having a matching unique identifier with the unique identifier associated with the recovered lost physical item; and
   d) communicating a notification to the user device based on the contact information associated with the database record having the matching unique identifier, the notification to the user device identifying the recovered lost physical item;

e) transmitting to the user device a query requesting at least one of one or more of the features of the physical item or the user identification stored in the record database; and f) responsive to receiving a response to the query matching the at least one of the one or more of the features or the user identification stored in the record database, transmitting to the user device information on shipping the recovered lost physical item.

4. A system as recited in claim 3, wherein the user interface includes one or more fields for receiving data and communicating through the communication network.

* * * * *